United States Patent

[11] 3,556,243

[72] Inventors Jerome R. Susag;
  Donald W. York, Battle Creek, Mich.
[21] Appl. No. 817,758
[22] Filed Apr. 21, 1969
[45] Patented Jan. 19, 1971
[73] Assignee Clark Equipment Company
  a corporation of Delaware

[54] STEERING SYSTEM
  3 Claims, 1 Drawing Fig.
[52] U.S. Cl. .................................................. 180/79.2
[51] Int. Cl. .................................................. B62d 5/08
[50] Field of Search.......................................... 180/79.2,
  45, 50

[56] References Cited
  UNITED STATES PATENTS
3,185,245  5/1965  Hoyt............................... 180/79.2
3,202,238  8/1965  Strader........................... 180/79.2
3,482,643  12/1969  Ivy................................. 180/79.2

Primary Examiner—Leo Friaglia
Assistant Examiner—John A. Pekar
Attorneys—Kenneth C. Witt, John C. Wiessler, Robert H. Johnson and Reginald J. Falkowski ABSTRACT: A fluid steering system for a land vehicle having front and rear pairs of dirigible wheels. First and second fluid motors are connected in series with each other and serve to actuate first and second valves, respectively, which control pivotal movement of the front and rear pairs of dirigible wheels. Under certain conditions of nonsynchronization of the front and rear pairs of wheels and pivotal movement of the pairs of wheels in a direction so that the front pair of wheels is lagging the rear pair of wheels, provision is made to bypass fluid around the second fluid motor so that the front pair of wheels can catch up with the rear pair of wheels when the rear pair of wheels is substantially in a centered position.

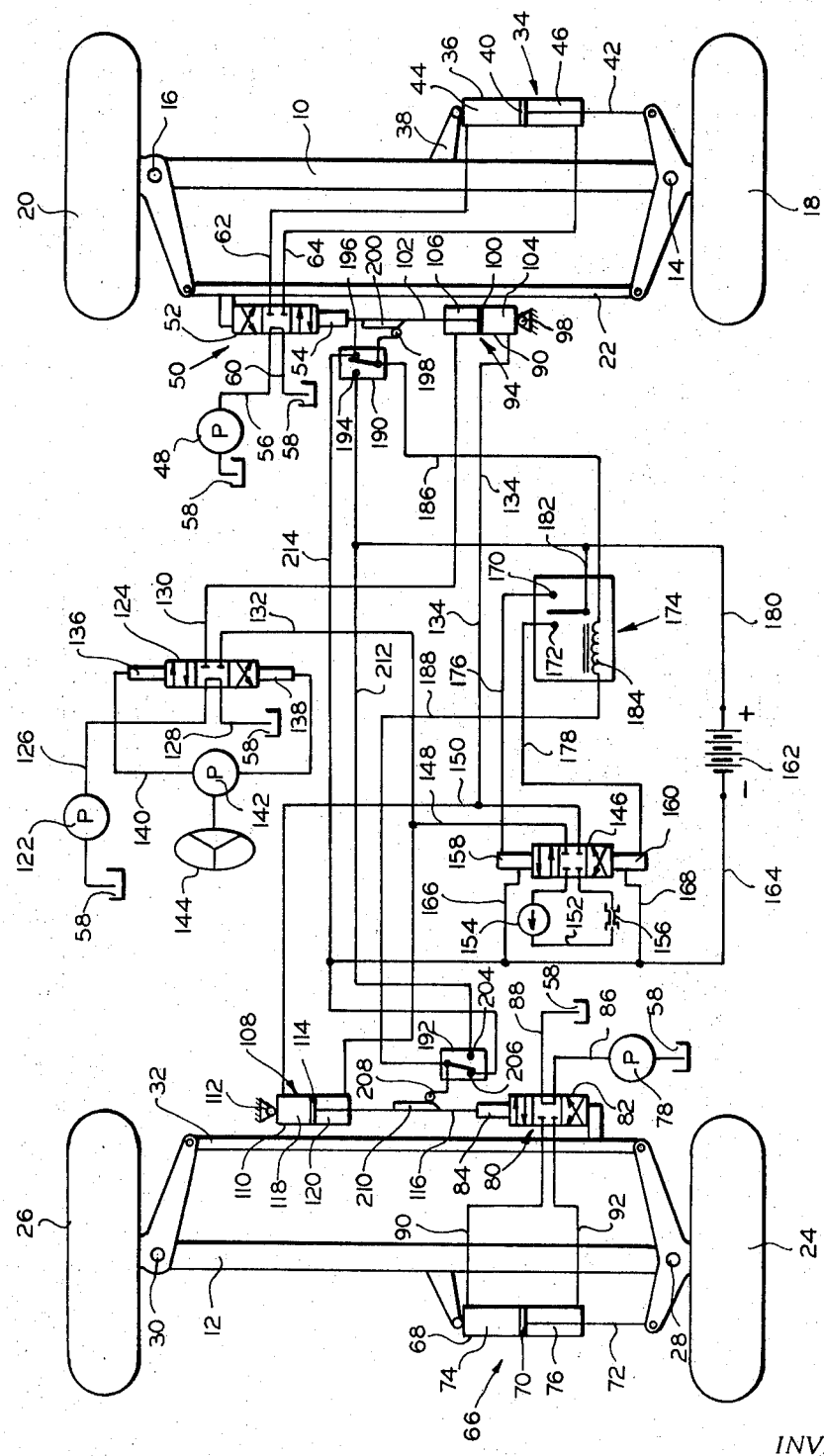

STEERING SYSTEM

BACKGROUND OF THE INVENTION

The field of art to which this invention relates includes fluid steering gear for motor vehicles.

One of the disadvantages of fluid steering systems is that when they are used with vehicles having four-wheel steering one of the pairs of wheels tends to get out of synchronization with the other pair of wheels. Consequently, it is the principal object of our invention to provide a self-synchronizing steering system which is n inexpensive and simple.

SUMMARY OF THE INVENTION

In carrying out our invention in a preferred embodiment there is provided first means including a first valve for pivoting the first pair of dirigible wheels and second means including a second valve for pivoting the second pair of dirigible wheels. Connected to the first valve is a first fluid motor and connected to the second valve is a second fluid motor. The fluid motors are connected in series and are connectable to a source of pressurized fluid so that they can be actuated in one direction or the opposite direction thereof. Another valve is cone connected in parallel with one of the fluid motors and is operable in response to the relative position of the first and second pairs of wheels so that when the rear pair of wheels is in a substantially centered position and the front pair of wheels is disposed in one direction from a centered position this valve is actuated to bypass the second fluid motor and permit fluid flow in one direction only and when the front pair of wheels is disposed in the the other direction from a centered position this valve is actuated to bypass the second fluid motor and permit fluid flow in the opposite direction.

The above and other objects, features and advantages of our invention will be more readily understood by persons skilled in the art when the detailed description is taken in conjunction with the drawing.

BRIEF DESCRIPTION OF THE DRAWING

The drawing shows diagrammatically and schematically our invention in conjunction with a portion of a land vehicle.

DESCRIPTION OF THE PREFERRED EMBODIMENT

Referring now to the drawing, the reference numeral 10 denotes the front axle of a vehicle and reference numeral 12 denotes the rear axle of the vehicle. Connected to axle 10 at the ends thereof for pivotal movement about substantially vertical steering axes 14 and 16 is a pair of dirigible wheels 18 and 20 which are connected by means of a tie bar 22. Similarly, a pair of wheels 24 and 26 is disposed at the outer ends of axle 12 for pivotal movement about substantially vertical steering axes 28 and 30. Wheels 24 and 26 are interconnected by means of a tie bar 32. The axle and wheel assemblies which have been described thus far are conventional, and further it will be obvious that since the wheels on both the front and rear axles are dirigible that the vehicle is provided with what is commonly referred to as a four-wheel steering system. Also, as will become apparent later in the description of the invention, the four-wheel steering system is of the type referred to as "radiarc" since the dirigible wheels on one axle are arranged to pivot in the opposite direction of the wheels on the other axle.

In order to pivot wheels 18 and 20 about their respective steering axes, a double-acting fluid motor 34 is provided. Motor 34 includes a cylinder 36 which is connected to axle 10 by means of a bracket 38 and a piston 40 slidably disposed in cylinder 36 and connected by a piston rod 42 to wheel 18. Piston 40 divides cylinder 36 into two fluid chambers 44 and 46.

Fluid motor 34 is actuated by means of pressurized fluid which is supplied by a pump 48 and controlled by a valve 50. Valve 50 is a conventional four-way open-center spool valve and includes a body 52 connected to tie bar 22 and a spool 54 slidably disposed in body 52. A supply conduit 60 is connected to body 52 of valve 50 and communicates with a reservoir 58. Disposed in supply conduit 56 is pump 48. Also, a return conduit 60 is connected to body 52 of valve 50 and communicates with reservoir 58. Two conduits 62 and 64 are connected to valve body 52 and communicate respectively with chambers 44 and 46 of fluid motor 34. By actuating valve 50 pressurized fluid from pump 48 can be directed to either chamber 44 or 46 of fluid motor 34 or simply returned to reservoir 58. As a result dirigible wheels 18 and 20 can be held in any given position or caused to pivot in one direction or the other about steering axles 14 and 16.

Dirigible wheels 24 and 26 are pivoted about steering axes 28 and 30 by a double-acting fluid motor 66 which includes a cylinder 68 connected to axle 12 and a piston 70 slidably disposed in cylinder 68 and connected to dirigible wheel 24 by a piston rod 72. Piston 70 divides cylinder 68 into two chambers 74 and 76. Fluid motor 66 is actuated by means of pressurized fluid supplied by a pump 78 and controlled by a valve 80. Valve 80 is a conventional four-way open-center spool valve and includes a body 82 connected to tie bar 32 and a a spool 84 slidably disposed in body 82. Pump 78 is disposed in a conduit 86 which communicates with reservoir 58 and is connected to valve body 82. A return conduit 88 also is connected to valve body 82 and communicates with reservoir 58. Two conduits 90 and 92 are connected to valve body 82 and communicate respectively with chambers 74 and 76 of fluid motor 66. Operation of valve 80 will cause pressurized fluid from pump 78 to be returned directly to reservoir 58 or directed either to chamber 74 or chamber 76 so that dirigible wheels 24 and 26 may be held in any given position or pivoted in one direction or the other, as desired.

Spool 54 of valve 50 is actuated by a double-acting fluid motor 94 which includes a cylinder 90 connected to the body of the associated vehicle at 98 and a piston 100 slidably disposed in cylinder 90 and connected to spool 54 by a piston rod 102. Piston 100 divides 90 into two chambers 104 and 106. Spool 84 of valve 80 is actuated by a double-acting fluid motor 108 which includes a cylinder 110 connected to the associated vehicle body at 112 and a piston 114 which is slidably disposed in cylinder 110 and connected to spool 84 by piston rod 116. Piston 114 divides cylinder 110 into two chambers 118 and 120.

Fluid motors 94 and 108 are actuated by pressurized fluid which is supplied by a pump 122 and controlled by a conventional four-way open-center spool valve 124. Connected to valve 124 is a supply conduit 126 which communicates with reservoir 58 and in which pump 122 is disposed. Also connected to valve 124 is a return conduit 128 which communicates with reservoir 58, a conduit 130 which communicates with chamber 106 of fluid motor 94 and a conduit 132 which communicates with chamber 120 of fluid motor 108. Fluid motors 94 and 108 are connected in series by means of a conduit 134 which communicates chamber 104 with chamber 118. At this point it will be clear that by manipulating valve 124 so that pressurized fluid is supplied to conduit 130 and conduit 132 is connected to reservoir 58, that fluid motor 94 will retract while fluid motor 108 will extend. By manipulating valve 124 so that pressurized fluid is supplied to conduit 132 and conduit 130 is connected to reservoir 58 the action of fluid motors 94 and 108 is reversed, that is, fluid motor 108 will retract and fluid motor 94 will extend.

Valve 124 is actuated by the use of differential fluid pressure. That is, valve 124 includes fluid chambers 136 and 138 disposed at opposite ends of the spool. Chambers 136 and 138 are connected by means of a conduit 140 in which a reversible fluid pump 142 is disposed. Pump 142 is connected to a steering control wheel 144 so that rotation of steering control wheel 144 causes pump 142 to direct pressurized fluid either to chamber 136 or 138, depending upon the direction of rotation of steering control wheel 144 and hence pump 142. As a result the spool of valve 124 will shift in the direction away from the chamber which has the higher pressure therein.

In order to maintain synchronization between the dirigible wheels connected to front axle 10 and the dirigible wheels connected to rear axle 12 there is provided a conventional four-way closed-center valve 146 which permits fluid to bypass fluid motor 108 under certain operating conditions so that dirigible wheels 18 and 20 can be moved while dirigible wheels 24 and 26 are maintained in a substantially centered position. Valve 146 is connected by a pair of conduits 148 and 150 to conduits 132 and 134, respectively. Also connected to valve 146 is a conduit 152 in which a one-way check valve 154 and a flow restrictor 156 are disposed in series. It will be apparent that with valve 146 in the position shown in the drawing that direct fluid communication between conduits 132 and 134 through b valve 146 is blocked. By actuating valve 146 to one position conduits 132 and 134 will be placed in fluid communication through valve 146 for restricted fluid flow from conduit 132 to conduit 134. When valve 136 is actuated to another position conduits 132 and 134 placed in fluid communication through valve 146 for restricted fluid flow from conduit 134 to conduit 132.

Valve 146 is actuated by a pair of solenoids 158 and 160 connected thereto so that energization of solenoid 158 causes valve 146 to move from the closed position shown on the drawing to a position in which conduits 132 and 134 are connected for fluid flow from conduit 132 to conduit 134 and energization of solenoid 160 causes valve 146 to be actuated so that conduits 132 and 134 are connected for fluid flow from conduit 134 to conduit 132.

Solenoids 158 and 160 are actuated by a suitable source of electrical power which in this case is a battery 162. Connected to one side of battery 162 is a conductor 164 to which solenoids 158 and 160 are connected by conductors 166 and 168, respectively. Solenoids 158 and 160 also are connected to contacts 170 and 172, respectively, of a single-pole double-throw solenoid actuated switch 174 by conductors 176 and 178, respectively. Switch 174 is connected by a pair of conductors 180 and 182 to one side of battery 162 and also includes a solenoid 184. Solenoid 184 is connected by a pair of conductors 186 and 188 to a pair of single-pole double-throw switches 190 and 192, as shown.

Switch 190 includes a pair of contacts 194 and 196 and is spring biased to complete a circuit through contact 194. Switch 190 also includes a lever 198 which is disposed to engage a projection 200 connected to rod 102 so that when lever 198 engages projection 200 switch 190 is operated to open contact 194 and close contact 196.

Switch 192 includes a pair of contacts 204 and 206 and is spring biased to close contact 204. Switch 192 also includes lever 208 disposed to engage a projection 210 connected to rod 116 so that when lever 208 engages projection 210 switch 192 is operated to open contact 204 and close contact 206.

Contacts 194 and 204 are connected by a conductor 212 which also is connected to conductor 180. Similarly, contacts 196 and 206 are connected by a conductor 214 which also is connected to conductor 164.

In order to enable persons skilled in the art to more clearly understand our invention, we will now explain the operation of it. It will be assumed that the vehicle is being driven forwardly, that is, toward the right as viewed in the drawing, with both pairs of dirigible wheels disposed in a straightforward position. If the operator of the vehicle now desires to have the vehicle turned to the left he will rotate steering control wheel 144 in a counterclockwise direction as viewed from the operator's position so that pressurized fluid is supplied by pump 142 to actuate valve 124 to connect conduit 126 with conduit 130, whereby pressurized fluid is supplied to chamber 106 of fluid motor 94, causing fluid motor 94 to retract. This actuates valve 50 so that conduit 56 is connected to conduit 64 and pressurized fluid from pump 48 is supplied to chamber 46 of fluid motor 34 with the result that dirigible wheels 18 and 20 are pivoted in a counterclockwise direction as viewed in the drawing. Also, retraction of fluid motor 94 forces fluid out of chamber 104 with the result that fluid is forced into chamber 118, thus causing fluid motor 108 to extend. Extension of fluid motor 108 actuates valve 80 to connect conduit 86 to conduit 92 so that pressurized fluid from pump 78 is supplied to chamber 76 of fluid motor 66 with the result that dirigible wheels 24 and 26 are pivoted in a clockwise direction as viewed in the drawing.

If it is desired to make a right turn, the steering control wheel 144 is rotated in the opposite direction so that pump 142 provides a differential fluid pressure to actuate valve 124 to connect conduit 126 with conduit 132. As a result pressurized fluid from pump 122 is supplied to chamber 120 of fluid motor 108, thereby causing fluid motor 108 to retract. This causes valve 80 to be actuated so that conduit 86 is connected to conduit 90 whereby pressurized fluid from pump 78 is supplied to chamber 74 and causes dirigible wheels 24 and 26 to pivot in a counterclockwise direction. Retraction of fluid motor 108 forces fluid out of chamber 118 and into chamber 104 so that fluid motor 94 is extended. Extension of fluid motor 94 actuates valve 50 to connect conduit 56 with conduit 62 so that pressurized fluid from pump 48 is supplied to chamber 44 with the result that dirigible wheels 18 and 20 are caused to pivot in a clockwise direction.

It will be noted that when the dirigible wheels are positioned for travel in a straight line that projection 200 engages lever 198 of switch 190 so that contact 196 thereof is closed. At the same time projection 210 engages lever 208 of switch 192 so that contact 206 thereof is closed. With switches 190 and 192 in this condition switch 174 is not actuated and so valve 146 is disposed in the position shown in the drawing, whereby there is no direct communication between conduits 132 and 134. When the steering system is actuated to execute a left turn, as described above, projection 200 will be move downwardly so that it continues in engagement with lever 198, and similarly projection 210 is moved downwardly so that it continues in engagement with lever 208. Consequently, the condition of switches 190 and 192 remains the same. When the steering system is actuated to execute a right turn projection 200 moves upwardly away from engagement with lever 198, and similarly projection 210 moves upwardly away from engagement with actuator 208. As a result the condition of switches 190 and 192 is changed so that contacts 196 and 206 are opened and contacts 194 and 204 are closed. In this new condition of switches 190 and 192 switch 176 still is not actuated so that the position of valve 146 remains the same as before.

It will now be assumed that the vehicle is performing a right turn and that dirigible wheels 18 and 20 are out of synchronization with dirigible wheels 24 and 26 in that dirigible wheels 18 and 20 are pivoted further in a clockwise direction than dirigible wheels 24 and 26 are pivoted in a counterclockwise direction. Thus, on turning back to a straight-ahead position dirigible wheels 24 and 26 will reach a centered straight-ahead position first. When this occurs projection 210 will engage lever 208 so that switch 192 is operated to close contact 206. It will be remembered that in the course of making the right turn that projection 200 had moved away from lever 198 so that switch 190 had been actuated to close contact 194. Since dirigible wheels 18 and 20 are lagging dirigible wheels 24 and 26 in moving back to a straight-ahead position from a right turn the projection 200 will not yet engage lever 198. At this point contact 194 of switch 190 is closed and contact 206 of switch 192 is closed. This completes an electrical circuit between battery 162 and solenoid 184 which causes switch 174 to be operated to close contact 172 and energize solenoid 160. When this happens valve 146 will be actuated to connect conduits 148 and 150 so as to permit fluid flow directly from conduit 134 to conduit 132 and bypass fluid motor 108. This permits dirigible wheels 24 and 26 to remain stationary in the centered position while dirigible wheels 18 and 20 continue to pivot in a counterclockwise direction until they reach their centered position at which point projection 200 engages lever 198 and operates switch 190 to open contact 194 and close contact 196. When this occurs the electrical circuit between battery 162 and solenoid 184 is opened and switch 174 returns to its normal position in which neither contact 170 nor contact 172 is closed. If during a right turn dirigible wheels 24 and 26 are pivoted further in counterclockwise direction than dirigible wheels 18 and 20 are pivoted in a clockwise direction, on returning to a straight-ahead position dirigible wheels 18 and 20 will reach a centered position first. When this occurs projection 200 will engage lever 198 of switch 190 so that contact 196 is closed while projection 210 will not yet have engaged actuator 208 of switch 190 so that contact 204 will still be closed. Consequently, an electrical circuit will be completed between battery 162 and solenoid 184, but the direction of current flow in this circuit will be reversed from the situation where dirigible wheels 24 and 26 are leading rather than lagging. Since current flow through solenoid 184 is reversed, switch 174 will be actuated to close contact 170 with the result that solenoid 158 is energized, thereby causing valve 146 to be actuated so that conduits 148 and 150 are connected to permit fluid flow from conduit 132 toward conduit 134. However, conduit 134 is connected through valve 124 and conduit 128 to reservoir 58. Thus, there will be a lower pressure in conduit 132 than in conduit 134 with the result that there cannot be any fluid flow directly between the two conduits and bypassing fluid motor 108. This clearly is necessary because if fluid motor 108 were bypassed in this situation it would only put the dirigible wheels further wheels further out of synchronization.

It will now be assumed that the steering system is conditioned for a left turn and that the dirigible wheels are out of synchronization so that dirigible wheels 18 and 20 have pivoted further in a counterclockwise direction than dirigible wheels 24 and 26 have pivoted in the clockwise direction. In bringing the dirigible wheels back to a straight-forward position, dirigible wheels 24 and 26 will come to the centered position first. Since dirigible wheels 18 and 20 have not yet reached the centered position so that the vehicle will proceed straight forward the operator will continue to actuate the steering system to pivot dirigible wheels 18 and 20 in a clockwise direction. When this occurs dirigible wheels 24 and 26 will start to move in a counterclockwise direction past their centered position. When this occurs projection 210 moves away from lever 208 so that switch 192 will operate to open contact 204. When this occurs an electrical circuit between battery 162 and solenoid 184 will be completed with a direction of current flow such that switch 172 will be actuated to close contact 170 which will result in solenoid 158 being energized. Energization of solenoid 158 will cause valve 146 to be actuated so that conduit 132 is connected to conduit 134 for fluid flow from conduit 132 toward 134. Since pressurized fluid is being supplied to conduit 132 through valve 124 from pump 122 there will be a fluid flow from conduit 132 to conduit 134 and fluid motor 108 will be bypassed. This will permit dirigible wheels 24 and 26 to remain in a substantially centered position while dirigible wheels 18 and 20 continue to pivot in a clockwise direction until slightly past their centered position at which pint point projection 200 will move away from lever 198 to permit switch 190 to operate so as to open contact 196 and close contact 194. When this occurs the dirigible wheels will be in synchronization and the electrical circuit between battery 162 and solenoid 184 will be opened with the result that switch 174 is actuated to open contact 170. Valve 146 will then return to the position shown in the drawing and fluid will no longer be bypassed around motor 108.

When the steering system is conditioned for a left turn and the dirigible wheels are out of synchronization such that dirigible wheels 18 and 20 will lead dirigible wheels 24 and 26 as the dirigible wheels are returned to straight-ahead, valve 146 will be actuated to permit fluid flow from conduit 134 to conduit 132 as dirigible wheels pass the straight-ahead position. However, fluid flow will not bypass motor 108 since the pressure in conduit 132 is higher than in conduit 134.

While only a single embodiment of our invention has been described hereinabove, it will be understood that this description is intended to be illustrative only and that various modifications and changes can be made to our invention without departing from the spirit and scope of it.

I claim:

1. For use with a vehicle having a body and first and second dirigible wheel means spaced longitudinally from each other and pivotal about substantially vertical steering axes, a steering system comprising first means for pivoting the first wheel means in one direction or the opposite direction from a centered position, the said first pivoting means including a first valve having a first element connected to the first wheel means and a second element movable relative to the said first element for controlling pivoting of the first wheel means second means for pivoting the second wheel means in one direction or the opposite direction from a centered position, the said second pivoting means including a second valve having a third element connected to the second wheel means and a fourth element movable relative to the said third element for controlling pivoting of the second wheel means, a first fluid motor for actuating the said first valve, the said first fluid motor including a fifth element connected to the said second element, a sixth element connected to the vehicle body, and first and second fluid chambers, a second fluid motor for actuating the said second valve, the said second fluid motor including a seventh element connected to the said fourth element, an eighth element connected to the vehicle body, and third and fourth fluid chambers, a source of pressurized fluid, a fluid reservoir, a first conduit connected to the said first chamber, a second conduit connecting the said second and third chambers, a third conduit connected to the said fourth chamber, a third valve connected to the said source, reservoir and first and third conduits and operable to connect the said first conduit to the said source and the said third conduit to the said reservoir and vice versa, and means responsive to the positions of the first and second wheel means for connecting the said second and third conduits for fluid flow from the said second conduit to the said third conduit when the second wheel means is substantially in the centered position thereof and the first wheel means is disposed away from the centered position thereof in one direction and connecting the said second and third conduits for fluid flow from the said third conduit to the said second conduit when the second wheel means is substantially in the centered position thereof and the first wheel means is disposed away from the centered position thereof in the opposite direction so that the first wheel means can be actuated to substantially the centered position thereof while the second wheel means remains substantially at the centered position thereof.

2. A steering system as set forth in claim 1 wherein the said connecting means includes valve means actuatable from a first position blocking fluid communication between the said second and third conduits to a second position connecting the said second and third conduits for fluid flow only from the said second conduit to the said third conduit or to a third position connecting the said second and third conduits for fluid flow only from the said third conduit to the said second conduit and means connected to the said valve means for actuating the said valve means to the said second or third positions thereof.

3. A steering system as set forth in claim 2 wherein wherein the said actuating means includes a source of electrical power, first and second solenoids connected to the said valve means, 23 a first switch connected to the said source of electrical power and the said solenoids and operable from a first position in which neither solenoid is energized to a second position in which the said first solenoid is energized or to a third position in which the said second solenoid is energized, a third solenoid connected to the said first switch, a second switch actuatable between first and second positions, and a third switch actuatable between third and fourth positions, the said second and third switches being connected in circuit to the said source of electrical power, the said third solenoid and each other and actuatable to connect the said third solenoid to the said source for current flow in one direction or the other direction or to open the circuit.